United States Patent [19]

Lucas

[11] 4,138,125
[45] Feb. 6, 1979

[54] PISTON RING WITH EXPANSIVE FORCE RESPONSIVE TO PRESSURE

[76] Inventor: William J. Lucas, 2347 38th St., Rock Island, Ill. 61201

[21] Appl. No.: 537,904

[22] Filed: Jan. 2, 1975

[51] Int. Cl.$^2$ ................................................ F16J 9/20
[52] U.S. Cl. .................................................... 277/170
[58] Field of Search ............... 277/170, 172, 171, 173, 277/222

[56] References Cited

U.S. PATENT DOCUMENTS

| | | | |
|---|---|---|---|
| 1,756,905 | 4/1930 | Morton | 277/222 |
| 1,841,772 | 1/1932 | Williams | 277/170 X |
| 2,522,764 | 9/1950 | Roberts | 277/172 |
| 3,554,568 | 1/1971 | Heid, Jr. | 277/170 |
| 3,727,927 | 4/1973 | Packard | 277/170 |

FOREIGN PATENT DOCUMENTS 1082513  6/1954  France ........................................ 277/170

Primary Examiner—Robert I. Smith
Attorney, Agent, or Firm—Glenn H. Antrim

[57] ABSTRACT

The lower side of a piston ring slants downwardly in an outwardly direction at an acute angle to its upper side that is perpendicular to the wall of the piston. Spacings along the upper side and inward side of the ring permits conduction of gas for pressing downwardly and outwardly, respectively. According to the principle of an inclined plane, force downwardly on the lower inclined surface provides an outward component to act with the pressure at the inward side of the ring and with moderate expansive tension to counteract inward force from pressure on the outer surface of the ring.

1 Claim, 4 Drawing Figures

PISTON RING WITH EXPANSIVE FORCE RESPONSIVE TO PRESSURE

BACKGROUND OF THE INVENTION

This invention relates to piston and ring assemblies and particularly to assemblies having rings that use fluid pressure to increase the expansive force of the rings against cylinder walls of reciprocating engines and pumps in which they are used.

Conventional rings are substantially rectangular in cross section and depend on tension of their material for expansion to maintain pressure of the circumferential surfaces of the rings against their cylinder walls during the complete cycles of the operation of the pistons. The prevention of flutter of the rings at high speeds of operation of internal combustion engines may determine the maximum tension required. Because of the high tension required in high-compression, high-speed engines, the rings must be fabricated from alloys that are more expensive than cast iron. The tension required to prevent flutter and the resulting blowby and loss of lubricating oil is often sufficient to cause excessive wear of the rings and the cylinder walls. To decrease the rate of wear, the outside surfaces of rings are conventionally treated with various metals and oxides.

Various shapes of rings and grooves have been disclosed to cause forces other than that from expansive tension to be applied during at least a portion of each operating cycle to help provide a seal between the piston and the cylinder walls. None of these structures have been generally adopted in place of conventional rectangular rings similar to those that have been in use for a long time. The different forces, including the substantial forces from combustion and the changing inertial forces at high speeds, in a reciprocating internal-combustion engine are changing rapidly during a cycle of operation. The structure that provides forces to supplement favorably the inherent expansive tension of rings during one part of a cycle may be detrimental at another part of the cycle. When the rings and grooves of a piston are complicated in structure, the cost of manufacture would obviously be increased.

SUMMARY OF THE INVENTION

A piston ring of this invention has the upper side perpendicular to the wall of a piston like a conventional ring, but most of the lower side is slanted downwardly in an outward radial direction at an acute angle. The geometrical structure is quite simple to maintain low manufacturing costs.

The dimensions of the ring are chosen to provide spacing between either its upper or lower side and the adjacent wall of the groove in which it is fitted, and a spacing at the inner circular wall of the ring. These spacings are only as wide as required to conduct fluid rapidly, compared with the period of a cycle of operation, from a high pressure area at the circumferential side of the ring to the space along at least one of the upper and lower sides of the ring and the space along the inner side of the ring. The ring has only moderate or light inherent expansive tension, and the pressures in the spaces tend to aid the tension of the ring to counteract the inward pressure along its circumferential side. The pressure within the inner space is applied directly outwardly, whereas the pressure in the space along the upper side of the ring forces the ring downwardly against the lower, slanting wall of its groove. The downward pressure on the slanting side provides a component of outward force to aid in pressing the ring against the wall of the cylinder, the forces resulting from pressure in the spaces being proportional to the fluid force acting on the circumferential side of the ring. The radial thickness of the ring may be greater than the thickness of a conventional ring to provide increased force on the upper side of the ring to be applied to the lower slanting surface.

The use of these forces from fluid pressure usually eliminates the requirement for specially treated materials to provide wear and high tension characteristics. Only moderate expansive tension is required and this can usually be provided by relatively low-cost cast iron. During a portion of a cycle when the pressure against the outer edge of the ring is low, the force pressing the ring against the wall of the piston is low for obtaining a low rate of wear and low consumption of power.

DESCRIPTION OF THE PREFERRED EMBODIMENT

Figure 1:
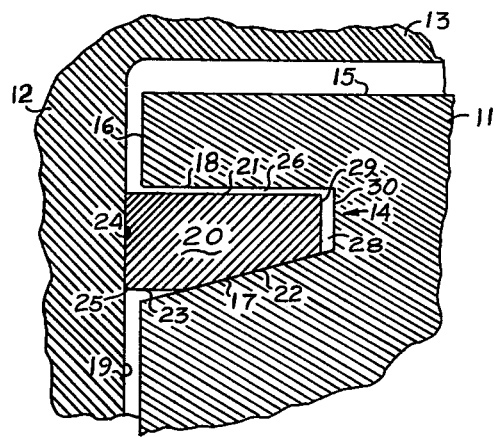
FIG. 1 is a fragmentary cross section of a piston, ring, and cylinder wall showing the ring of this invention in a downward position in a groove of the piston.
Figure 2:
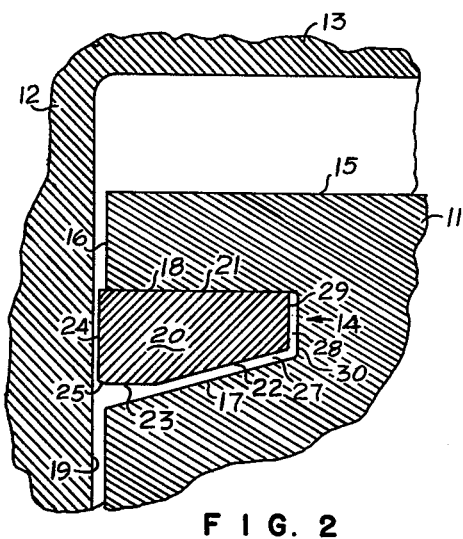
FIG. 2 is similar to FIG. 1 except the ring is in an upward position.

In FIGS. 1 and 2, an upper, outer portion of a piston 11 is shown in diametrical cross section within a cylinder wall 12 below a cylinder head 13. A peripheral groove 14 about the piston 11 is separated from the head or top 15 of the piston 11 by a usual land 16.

The location of the groove 14 is similar to that for conventional rings, but the depth of the groove may be greater, and the lower side wall 17 is slanted downwardly in an outwardly direction rather than being perpendicular to the radius of the piston 11. The upper side wall 18 of the groove 14 is perpendicular to the axis of the piston 11 and the inside surface 19 of the cylinder wall 12. The lower side wall 17 of the groove is slanted downwardly in an outwardly direction at an acute angle between 2° and 30° according to the usage of the piston 11.

A piston ring 20 shown in the groove 14 has an upper side 21 perpendicular to the wall of the piston to fit evenly against the upper side wall 18 of the groove 14 and a lower side 22 except for a relatively small outer edge portion, at the required acute angle with respect to the upper side 21 to fit evenly against the lower side wall 17 of the groove 14. The outer circular portion 23 of the lower side 22 has been formed to be perpendicular to the surface 19 of the cylinder wall 12. Preferably, before the seating of a new ring, its circumferential side 24 is at a slight slant from vertical such that the ring 20 contacts the wall 19 on a circumference just above the lower outer corner 25. A radius of approximately 0.005 inches on the lower corner 25 is desirable for a new ring to prevent sharp angular contact of the ring with the surface 19 before seating. The radius on the lower outer corner 25 in conjunction with the perpendicular portion 23 prevents excessive scraping of the ring against the piston wall.

The width and the thickness of the ring 20 are chosen to provide a spacing 26 (FIG. 1) or spacing 27 (FIG. 2) along one of its sides and a spacing 28 between a vertical inner side 29 of the ring and an adjacent inner wall 30 of the groove 14. These spacings 26–28 are provided when the circumferential side 24 of the ring 20 is pressed normally against the surface 19 of the cylinder wall 12.

The total, instantaneous force for expanding the ring 20 to maintain it in constant contact with surface 19 of the cylinder wall 12 is dependent on the intrinsic, expansive tension of the ring and fluid pressures acting within the spacings 26–28 about the ring. The tension of the ring is relatively small compared to that of conventional rings, but it alone is sufficient to provide outward force except when fluid adjacent the outer portion of the ring 20 is under substantial pressure. When pressure is encountered above the ring, for example, the pressure of combustion of an internal combustion engine, gas under pressure flows quickly over the upper side 21 of the ring and through the spacing 26 into the spacing 28 at the inner side of the ring. The gas in the spacing 28 presses directly outwardly on the ring 20 to counteract the force resulting from gas pressure between the circumferential side 24 and the surface 19 of the cylinder wall 12. The force downwardly on the upper side of the ring 21 is applied through the ring to its lower slanting side 22 for pressing it against the lower side wall 17 of the groove 14. According to the principles of an inclined plane, the downward force on the ring has an outwardly directed component that is added to the tension of the ring and to the force obtained in the spacing 28 for pressing the ring outwardly against the surface 19 of the cylinder wall 12. The forces resulting from fluid pressure for expanding the ring 20 counteract and are proportional to the inwardly directed forces acting between the circumferential side 24 and the surface 19 of the piston wall 12. The radial depth of the ring 20 and the slant of the lower side 22 of the ring and the adjacent lower side wall of the groove 14 may be chosen according to the dimensions of the cylinder and the pressures to be encountered during operation. As the angle of slant from a radial direction is increased, the outward force will increase to counteract the tendency to force the ring inwardly. A typical angle in a small internal combustion engine is 15°.

During the intake stroke of a gasoline engine, the ring 20 as shown in FIG. 2 will be positioned against the upper side wall 18 of the groove 14. Both the force of friction and the differences in pressure between the upper and lower sides of the ring 20 tend to position the ring upwardly. Since the difference in pressure is relatively small, the outward pressure on the ring 20 caused by its tension and moderate pressure in the spacings 27 and 28 is sufficient to maintain the ring in an expanded state. Compared with rings with high expansive tension, the present ring decreases wear of the ring and the surface of the cylinder wall because the outward force of the ring on the wall is small during much of the cycle of operation of the piston.

The power loss resulting from friction is greatly decreased. For a test, a small gasoline engine was fitted with a conventional compression ring, connected to a pump for a load, and while consuming 1 gallon of gasoline operated 1 hour and 5 minutes, at a speed of 2,850 rpm (revolutions per minute). After the conventional compression ring was replaced by a ring according to this invention, the engine still connected to the same pump operated at a speed of 3,150 rpm for 1 hour and 28 minutes on a gallon of gasoline.

The maintenance of even force about the circumference of a ring is a problem that is difficult to solve when the outward force is namely dependent on expansive tension. Using fluid pressure and the principle of the inclined plane to develop most of the outward force on the ring, the outward force throughout the full circumference of the ring is quite even.

Relatively low cost cast-iron materials have sufficient tension and wearing qualities to be fabricated into the present rings. The geometrical shape of the groove and the ring described above is simple so that the cost of machining is not increased materially over the cost required when rectangular rings are used.

Figure 3:
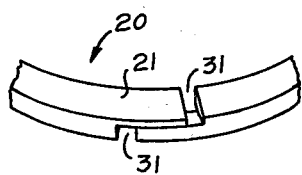
FIG. 3 is a perspective view of a step joint of the ring.
Figure 4:
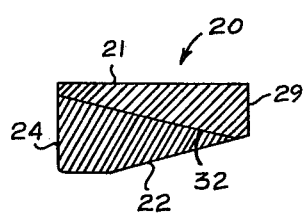
FIG. 4 is a cross-sectional view of the step joint of FIG. 3.

The usual gap 31 in the circumference of the ring can preferably be provided by a lap or joint construction such as shown in FIGS. 3 and 4. The split of the ring as viewed in cross section is on a line from a point on the circumferential side 24 a short distance below the upper outer corner to a point on the slanted lower side 22 at a point a short distance from the inner side 29 of the ring.

I claim:

1. A piston and ring assembly comprising: a piston having a peripheral groove in the upper portion of the cylindrical wall thereof, the upper side wall of said groove being perpendicular to said cylindrical wall, the lower side wall of said groove spaced from said upper side wall and slanted downwardly in an outwardly direction at an acute angle with respect to the direction of said upper side wall, a compression ring within said groove, the upper side of said compression ring being perpendicular to the axis thereof to fit evenly against said upper side wall of said groove, the lower side of said ring having an inner circular portion slanted downwardly in an outwardly direction at said acute angle with respect to said upper side thereof and an outer lower circular portion extending outwardly from said inner circular portion in a direction perpendicular to said cylindrical wall of said piston, whereby said inner circular portion fits evenly against said lower side wall of said groove and said outer lower circular portion is perpendicular to said cylindrical wall of said piston between said piston and an adjacent wall of a cylinder in which said piston is installed, said ring having moderate expansive tension for pressing the circumferential side of said compression ring against the wall of a cylinder in which said piston and ring assembly is installed, the dimensions of said ring relative to the dimensions of said groove being chosen to provide spacing between the inner circular wall of said ring and the inner wall of said groove and spacing along at least one side of said ring sufficient to transfer rapidly pressure from fluid adjacent the outer portion to said ring to said spacings, said ring having sufficient radial thickness to provide substantial downward force on said upper side of said ring from pressure developed in said cylinder, said acute angle being between 2 degrees and 30 degrees according to the requirements of a cylinder in which said piston and ring assembly is used, the angle being chosen to increase outward radial force on said ring resulting from downward pressure of fluid on said upper side of said compression ring to the extent required to maintain said circumferential side pressed against said wall of said cylinder during operation, said compression ring having a step joint for a ring gap, the line of the split of said step joint as veiwed in cross section being between a point somewhat below the upper outer corner of said compression ring to a point on said lower side a short distance from said inner circular wall.

* * * * *